Figure 1:
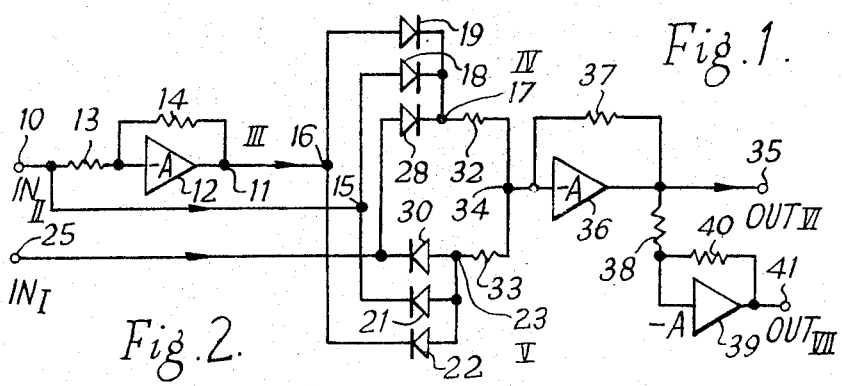

Oct. 11, 1966 R. MUDIE 3,278,765
APPARATUS FOR SHIFTING THE PHASE OF LOW
FREQUENCY OSCILLATIONS
Filed April 4, 1963

United States Patent Office 3,278,765
Patented Oct. 11, 1966

3,278,765
APPARATUS FOR SHIFTING THE PHASE OF LOW FREQUENCY OSCILLATIONS
Ronald Mudie, Crowborough, England, assignor to Servomex Controls Limited, Crowborough, England
Filed Apr. 4, 1963, Ser. No. 270,717
Claims priority, application Great Britain, Apr. 9, 1962, 13,557/62
11 Claims. (Cl. 307—106)

This invention relates to a method and apparatus for shifting the phase of low frequency oscillations, and in particular for shifting the phase of a given low frequency triangular wave oscillation by 90°, as the initial operation for providing four waves in mutual phase quadrature relationship.

Various forms of low frequency oscillators are known which provide as simultaneous outputs both a triangular wave and a square wave of the same frequency.

There are also known non-linear networks which provide a sine wave output from a triangular wave input.

Thus, a method and apparatus for shifting the phase of a triangular wave input to such a network is also effective to shift the phase of the resultant sine wave.

There are various applications for low frequency oscillators where it is desirable to have four sine waves in 0°, 90°, 180° and 270° phase relationship. This can be achieved, by generating a first sine wave, deriving a second wave 90° advanced in phase with respect to the first wave, generating a third wave 180° out of phase with the first wave, and a fourth wave 180° out of phase with the second wave.

However, the known phase shifting networks for this purpose are frequency sensitive. Thus, the circuit constants require continuous adjustment if a variable frequency sine wave output is required.

The first object of the present invention is to provide a network for phase-shifting a triangular wave, which network is frequency independent.

A further object is to provide four waves, triangular or sinusoidal, in mutual phase quadrature relationship.

The present invention provides a method of shifting the phase of a low frequency triangular wave, comprising the steps of reversing the phase of a first triangular wave to derive a second triangular wave shifting in phase from the first triangular wave by 180°, rectifying the first and the second triangular waves in one sense and adding the two series of resultant intermittent pulses to form a first series of continuous pulses, rectifying the first and the second triangular waves in a sense opposite to the first-mentioned sense and adding the further two series of resultant intermittent pulses to form a second series of continuous pulses, and adding a square wave, having the same cyclic periodicity as the first triangular wave and changing polarity at the peaks of the first triangular wave, to the first and the second series of continuous pulses alternately in successive half-cycles to produce a third triangular wave shifting in phase by 90° relative to the first triangular wave.

The invention also provides apparatus for performing the above-mentioned method.

In order that the invention may be readily carried into effect, a preferred embodiment with its component elements will now be described in detail, by way of example, with reference to the accompanying drawings, in which similar components have similar reference numerals or letters.

Figure 2:
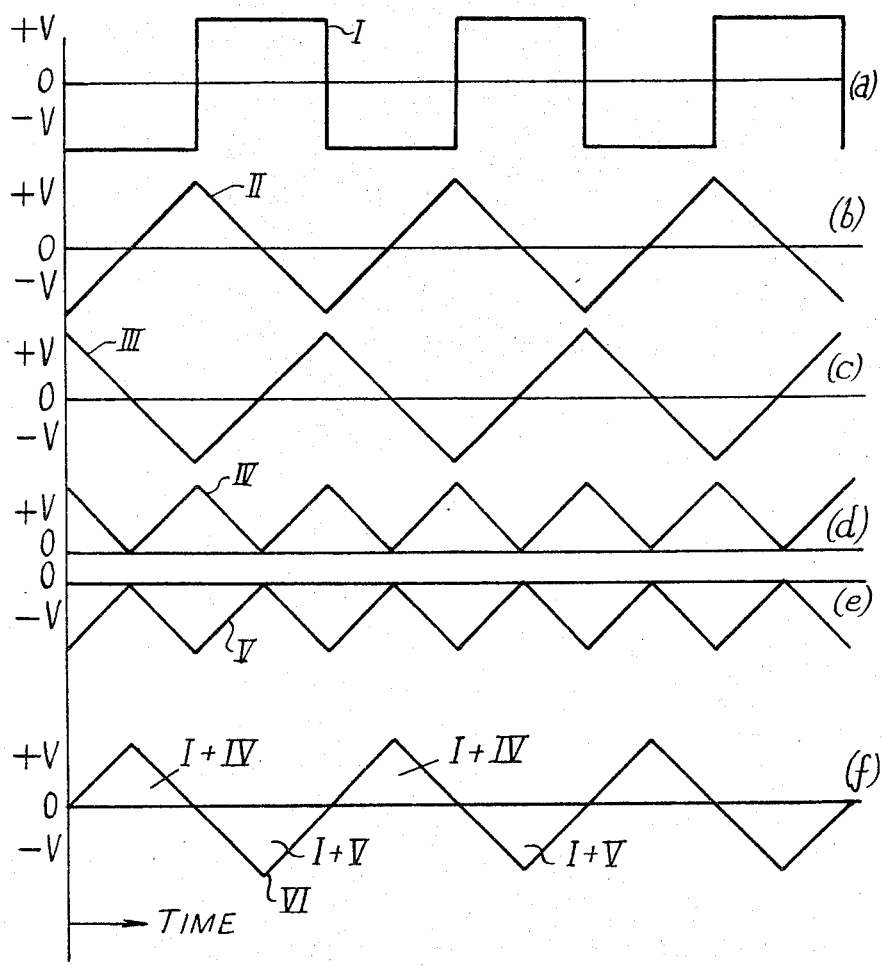

The above and other objects and advantages of the invention will become apparent upon full consideration of the following detailed description and accompanying drawings in which:

FIGURE 1 is a schematic diagram of a frequency-independent circuit arrangement for phase-shifting a triangular wave, according to the invention; and FIGURE 2 is a graph showing waveforms relating to the circuit arrangement of FIGURE 1.

In the circuit diagram of FIGURE 1, Arabic numerals indicate circuit components and Roman numerals identify waveforms corresponding to those similarly referenced in FIGURE 2.

The circuit comprises an input terminal 10, an output terminal 11 and a series amplifier 12, having a series resistance 13 and feedback resistance 14 so that this part of the circuit provides an overall gain of minus unity, as indicated by the reference —A.

Accordingly, the input waveform II applied at terminal 10 appears as the inverted, that is phase-reversed, waveform III at terminal 11.

The circuit further comprises a rectifying and adding network having separate inputs at terminals 15 and 16 and having a single output at terminal 17, similarly-sensed diodes 18 and 19 in series with terminals 15 and 16, respectively, and a summing resistor 32 between the output terminal 17 and a terminal 34.

Input waveforms II and III, respectively at terminals 15 and 16, having the mutual phase relationship of FIGURE 2(b) and (c), provide the output waveform IV at terminal 17.

The circuit also comprises another rectifying and adding network similar to that described above but oppositely-phased. The oppositely-phased network comprises diodes 21 and 22, in series respectively with terminals 15 and 16, both diodes oppositely-sensed from diodes 18 and 19, an output terminal 23 and a summing resistor 33 between the terminal 23 and the terminal 34.

As in the first described rectifying and adding network, the waveforms II and III provide the output waveform V at terminal 23.

Thus, positive-going continuous triangular pulses are produced at terminal 17 and the corresponding, negative-going continuous pulses at terminal 23.

Referring to FIGURE 2, it will be noted that the waveforms II and III of FIGURE 2(b) and (c) bear an 180° phase relationship to each other and that both have the same cycle repetition frequency as the step-function or square waveform I of FIGURE 2(a). Waveforms IV and V of FIGURE 2(d) and (e) bear an 180° phase relationship to each other have the same cyclic repetition frequency as each other, but double the repetition frequency of the waveforms I, II and III.

Thus, FIGURE 1 has an input 10 for waveform II followed by an inverting circuit comprising series resistor 3, amplifier 12 and feedback resistor 14, providing an amplifier with gain of minus unity. Thus, the inverted waveform III appears at terminal 11 and fed to terminal 16. This part of the circuit comprises oppositely-sensed diodes 19 and 22.

The waveform II is also applied directly to terminal 15 of this part of the circuit which is associated with oppositely-sensed diodes 18 and 21.

An input terminal 25 reserves waveform I which is applied to oppositely-sensed diodes 28 and 30.

Diodes 18, 19 and 28 have a common summing resistor 32 and diodes 21, 22 and 30 have a common summing resistor 33. Both summing resistors feed the operational amplifier 36, 37 which supplies waveforms VI at terminal 35.

More particularly, and with reference to FIGURE 2, the sole inputs to the circuit are the waveforms I and II of FIGURE 2(a) and (b). The waveform III is derived at terminals 11 and 16. The series of continuous triangular pulses of waveforms IV and V, FIGURE 2(d) and (e), are derived at the summing resistors 32 and 33, respectively. The remainder of the circuit receives also the waveform I and sums this together with the waveforms IV and V in a manner described in more detail below, to provide the 90° displaced waveform VI at terminal 35.

More particularly, during the first half-cycle of the waveform I of FIGURE 2(a), the positive half-cycle of waveform IV is summed with the negative half-cycle of waveform I to provide the negative half-cycle of waveform VI. During the next half-cycle of waveform I, the negative-going pulses of waveform V are summed with the positive half-cycle of waveform I to provide the positive half-cycle of waveform VI. The summed outputs of the first and second half-cycles, and subsequent odd and even half-cycles, are added together by using the two inputs of the operational amplifier, thereby providing the continuous waveform VI at terminal 35.

It will be particularly noted from FIGURE 2(f) that the waveform VI is 90° displaced relatively to the waveforms II and III of FIGURE 2(b) and (c).

If a fourth waveform is required, corresponding to the inverted form of waveform VI, a further inverting circuit is provided comprising input resistor 38 and inverting amplifier 39, 40 supplying output terminal 41. This inverted waveform is identified as VII in FIGURE 1.

In FIGURE 2, the various waveforms I to VI are shown having equal amplitudes. If the starting waveforms are not thus related, intermediate amplifiers may be provided. The essential requirement is that waveforms I, IV and V have equal amplitudes for the summing operations using these waveforms.

The resultant waveforms II, III, VI and VII, comprising four waveforms in quadrature phase relationship, may be used as derived, that is, in triangular form. More usefully, however, they are converted into sinusoidal waveforms by shaping networks and suitable networks for this purpose are known.

Alternatively, two 90° phase related waveforms II and VI may be shaped to sinusoidal form and the inverted waveforms, corresponding to the sinusoidal forms of waveforms III and VII, then derived from them.

Various uses for a frequency variable combination of four quadrature waveforms, triangular or sinusoidal, will suggest themselves to those skilled in the art.

By way of example, the four waveforms may be supplied to a potentiometer having a continuous circular track, the four waveforms being supplied at four quadrature taps. A variable rotary tap will then provide an output at any desired phase relationship to a given reference and a fixed scale may be calibrated in phase-angle degrees accordingly.

Additional embodiments of the invention in this specification will occur to others and therefore it is intended that the scope of the invention be limited only by the appended claims and not by the embodiments described hereinabove. Accordingly, reference should be made to the following claims in determining the full scope of the invention.

What is claimed is:
1. Apparatus for shifting the phase of a first low-frequency triangular wave comprising rectifying and adding means forming a first series of continuous pulses in one sense from the first triangular wave, rectifying and adding means forming a second series of continuous pulses in a sense opposite to the first mentioned sense and in phase with the first series of continuous pulses from the first triangular wave, and means having the same cyclic periodicity as the first triangular wave for adding a square wave to the first and second series of continuous pulses alternately in successive half-cycles to produce a second triangular wave shifted in phase by 90° relative to the first triangular wave.

2. Apparatus according to claim 1 further comprising the means reversing the phase of the first triangular wave to derive a third triangular wave shifted in phase from the first triangular wave by 180°, means for rectifying the first and third triangular waves in said one sense and adding the two series of resultant intermittent pulses to form the first series of continuous pulses, and further means for rectifying the first and third triangular waves in said opposite sense and adding the further two series of resultant intermittent pulses to form the second series of continuous pulses.

3. Apparatus according to claim 1 including providing four triangular waves in mutual quadrature phase relationship, means reversing the phases of the first and second triangular waves to derive third and fourth triangular waves shifted in phase by 180° from the first and second triangular waves, respectively.

4. Apparatus according to claim 1 for providing four sinusoidal waves in mutual quadrature phase relationship, wherein are means for supplying each of the said four triangular waves to a shaping network to provide the corresponding four sinusoidal waves in mutual quadrature phase relationship.

5. Apparatus according to claim 1 for providing four sinusoidal waves in mutual quadrature phase relationship wherein are means for supplying to shaping networks said second triangular wave and either one of said first and third triangular waves, to provide corresponding sinusoidal waves in quadrature phase relationship and reversing the phase of both sinusoidal waves to provide third and fourth sinusoidal waves.

6. Apparatus according to claim 2 having an amplifier with minus unity gain for reversing said first-mentioned triangular wave to derive said third triangular wave, means having a similarly sensed pair of diodes, respectively supplied with said first and third triangular waves, and with a common summing load to provide said first series of continuous pulses, means having a similarly sensed pair of diodes, oppositely sensed from said first-mentioned pair of diodes, respectively supplied with said first and third triangular waves, and with a common summing load to provide said second series of continuous pulses, means having fifth and sixth diodes respectively similarly sensed as said first pair of diodes and as said second pair of diodes, each with the same summing resistor as said respective diode pairs, both fifth and sixth diodes being supplied with said square wave, and both summing resistors supplying a second amplifier of minus unity gain to produce said second triangular wave.

7. Apparatus according to claim 6, including a third amplifier with minus unity gain for reversing said second triangular wave to derive said fourth triangular wave.

8. Apparatus according to claim 6, including four triangular-to-sinusoidal wave-shaping networks, each one supplied with one of said four triangular waves.

9. Apparatus according to claim 8, including two triangular-to-sinusoidal shaping networks supplied respectively with said second and either one of said first and third triangular waves, and with two further amplifiers with minus unity gain supplied respectively with the sinusoidal output waves from said shaping networks.

10. Apparatus for providing a wave at a variably selected phase-relationship to a first wave comprising providing four waves in quadrature according to claim 3, including means supplying said quadrature waves to quadrature taps of a circular potentiometer.

11. Apparatus according to claim 7, including a circular potentiometer having quadrature taps to which the four quadrature waves are supplied.

References Cited by the Examiner
UNITED STATES PATENTS
3,049,660    8/1962    Roberti et al. _____ 307—88.5

MILTON O. HIRSHFIELD, *Primary Examiner.*

J. J. SWARTZ, *Assistant Examiner.*